(12) United States Patent
Weng et al.

(10) Patent No.: US 8,901,898 B2
(45) Date of Patent: Dec. 2, 2014

(54) METHODS AND APPARATUS FOR REGULATING OUTPUT VOLTAGE OF A POWER SUPPLY SYSTEM

(75) Inventors: So-Yu Weng, Sijhih (TW); Wen-Hung Huang, Hsichin (TW); Yung Fa Chueh, Taipei (TW)

(73) Assignee: Dell Products L.P., Round Rock, TX (US)

( * ) Notice: Subject to any disclaimer, the term of this patent is extended or adjusted under 35 U.S.C. 154(b) by 524 days.

(21) Appl. No.: 13/296,229

(22) Filed: Nov. 14, 2011

(65) Prior Publication Data

US 2013/0119952 A1     May 16, 2013

(51) Int. Cl.
*G05F 1/46*     (2006.01)
*G06F 1/26*     (2006.01)

(52) U.S. Cl.
CPC .......................................... *G06F 1/26* (2013.01)
USPC ............................. 323/226; 323/274; 323/303

(58) Field of Classification Search
USPC ......... 323/282, 284, 285, 299, 303, 223, 226, 323/273, 274
See application file for complete search history.

(56) References Cited

U.S. PATENT DOCUMENTS 6,472,857 B1 * 10/2002 Genest et al. ................. 323/303
7,279,878 B2 * 10/2007 Ootani et al. ................. 323/285

* cited by examiner

*Primary Examiner* — Gary L Laxton
(74) *Attorney, Agent, or Firm* — Baker Botts L.L.P.

(57) ABSTRACT

A power supply system includes a first connector, a second connector, a first circuit for detecting a magnitude of a current drawn from an energy source by the power supply system and providing a related output related, and a second circuit for adjusting an output voltage supplied to the second connector based on output of the first circuit. The output voltage supplied to the second connector is at a first value when the output of the first circuit is below a first threshold. Further, the output voltage supplied to the second connector is at a second value, greater than said first value, when the output of the first circuit is above a second threshold. The output voltage supplied to the second connector is at a third value, between said first and second values, when the output of the first circuit is between the first and second thresholds.

17 Claims, 5 Drawing Sheets

METHODS AND APPARATUS FOR REGULATING OUTPUT VOLTAGE OF A POWER SUPPLY SYSTEM

TECHNICAL FIELD

The present disclosure relates generally to the field of power supply systems, and, more specifically, to methods and systems for enhancing power consumption efficiency of power supply systems in information handling systems.

BACKGROUND

As the magnitude and use of information continues to increase, individuals and businesses seek additional ways to process and store information. One option available to users is an information handling system. An information handling system generally processes, compiles, stores, and/or communicates information or data for business, personal, or other purposes thereby allowing users to take advantage of the magnitude of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for such systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Power supply systems, such as adapters, are essential to many modern electronic devices, including information handling systems (IHSs). Generally, power supply systems may convert one form of electrical power to another desired form and voltage, typically involving converting alternating current (AC) line voltage to a well-regulated lower voltage direct current (DC). Low voltage, low powered DC power supply systems may be commonly integrated with the devices they supply, such as IHSs and other electronic devices.

A regulated or stabilized power supply system may be one that includes circuitry to tightly control the output voltage or current within specific values. The specific values may be closely maintained despite variations in the load presented to the power supply system's output, or any reasonable voltage variation at the power supply system's input. In many instances, regulated power supply systems may output undesired signals. One explanation for undesired signals is a sudden change of the output voltage of the power supply systems when corresponding current signals reach certain levels. In such a situation, the output voltage of the power supply systems may enter into a turbulent stage and may further prevent the power supply systems from working in an efficient fashion.

Thus, a need may exist for improved methods and systems for regulating the output voltage of power supply systems to avoid undesired output voltage fluctuations, therefore enhancing energy efficiency and workability of such power supply systems. The methods and apparatus may utilize a relatively less complex control circuitry than what is currently being used and may comprise a minimal number of components.

SUMMARY

The following presents a general summary of several aspects of the disclosure in order to provide a basic understanding of at least some aspects of the disclosure. This summary is not an extensive overview of the disclosure. It is not intended to identify key or critical elements of the disclosure or to delineate the scope of the claims. The following summary merely presents some concepts of the disclosure in a general form as a prelude to the more detailed description that follows.

One aspect of the present disclosure provides a power supply system including a first connector suitable for coupling to an energy source, a second connector suitable for coupling to a load, a first circuit for detecting a magnitude of a current drawn from the energy source by the power supply system and providing an output related thereto, and a second circuit for adjusting an output voltage supplied to the second connector based on an output of the first circuit. The output voltage supplied to the second connector is at a first value when the output of the first circuit is below a given first threshold. Further, the output voltage supplied to the second connector is at a second value, greater than said first value, when the output of the first circuit is above a given second threshold. The output voltage supplied to the second connector is at a third value, between said first and second values, when the output of the first circuit is between the first and second given thresholds.

Another aspect of the present disclosure provides a method to enhance the efficiency of a power supply system, the method including supplying a first connector suitable for coupling to an energy source, supplying a second connector suitable for coupling to a load, and detecting, through a first circuit, the magnitude of the current drawn from the energy source by the power supply system and providing an output related thereto. The method also includes adjusting, through a second circuit, the output voltage supplied to the second connector based on the output of the first circuit. The output voltage supplied to the second connector is at a first value when the output of the first circuit is below a given first threshold, and the output voltage supplied to the second connector is at a second value, greater than said first value, when the output of the first circuit is above a given second threshold. The output voltage supplied to the second connector is at a third value, between said first and second values, when the output of the first circuit is between the first and second given thresholds.

Yet another aspect of the present disclosure provides a computer-readable storage medium having encoded thereon executable instructions for enhancing the efficiency of a power supply system, the instructions performing a method including supplying a first connector suitable for coupling to an energy source, supplying a second connector suitable for coupling to a load, and detecting, through a first circuit, the magnitude of the current drawn from the energy source by the power supply system and providing an output related thereto. The method also includes adjusting, through a second circuit, the output voltage supplied to the second connector based on the output of the first circuit; wherein the second circuit further comprises a feedback control unit for stabilizing the output voltage supplied to the second connector. The output voltage supplied to the second connector is at a first value when the output of the first circuit is below a given first threshold, and the output voltage supplied to the second connector is at a second value, greater than said first value, when the output of the first circuit is above a given second threshold. The output voltage supplied to the second connector is at a third value, between said first and second values, when the output of the first circuit is between the first and second given thresholds.

BRIEF DESCRIPTION OF THE DRAWINGS

For detailed understanding of the present disclosure, references should be made to the following detailed description of the several aspects, taken in conjunction with the accompanying drawings, in which like elements have been given like numerals and wherein.

DETAILED DESCRIPTION

Before the present systems and methods are described, it is to be understood that this disclosure is not limited to the particular systems and methods, as such may vary. Also, the present disclosure is not limited in its application to the details of construction, arrangement or order of components and/or steps set forth in the following description or illustrated in the figures. Thus, the disclosure is capable of other aspects, embodiments or implementations or being carried out/practiced in various other ways.

One of ordinary skill in the art should understand that the terminology used herein is for the purpose of describing possible aspects, embodiments and/or implementations only, and is not intended to limit the scope of the present disclosure which will be limited only by the appended claims. Further, use of terms such as "including", "comprising", "having", "containing", "involving", "consisting", and variations thereof are meant to encompass the listed thereafter and equivalents thereof as well as additional items.

It must also be noted that as used herein and in the appended claims, the singular forms "a," "and," and "the" may include plural referents unless the context clearly dictates otherwise. Thus, for example, reference to "a switch" refers to one or several switches and reference to "a method of regulating" includes reference to equivalent steps and methods known to those skilled in the art, and so forth.

For purposes of this disclosure, an embodiment of an Information Handling System (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS may be a personal computer, a network storage device, or any other suitable device and may vary in size, shape, performance, functionality, and price. The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, and a video display. The IHS may also include one or more buses operable to transmit data communications between the various hardware components.

Figure 1:
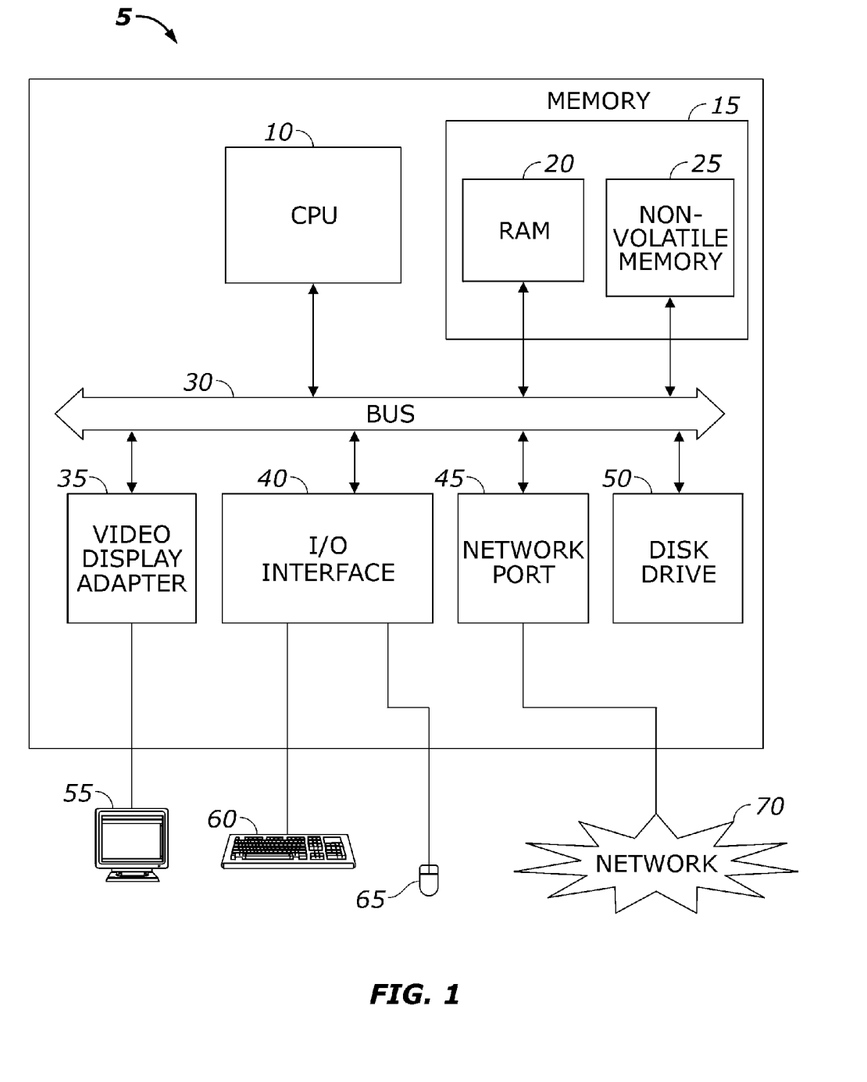
FIG. 1 represents an information handling system in accordance with one aspect of the present disclosure.

FIG. 1 illustrates one possible implementation of an IHS 5 comprising a CPU 10. It should be understood that the present disclosure has applicability to IHSs as broadly described above, and is not intended to be limited to the IHS 5 as specifically described. The CPU 10 may comprise a processor, a microprocessor, minicomputer, or any other suitable device, including combinations and/or a plurality thereof, for executing programmed instructions. The CPU 10 may be in data communication over a local interface bus 30 with components including memory 15 and input/output interfaces 40. The memory 15, as illustrated, may include non-volatile memory 25. The non-volatile memory 25 may include, but is not limited to, firmware flash memory, non-volatile random access memory (NVRAM), and electrically erasable programmable read-only memory (EEPROM). The non-volatile memory 25 may contain a firmware program (not shown) which may contain programming and/or executable instructions required to control a keyboard 60, mouse 65, video display 55 and/or other input/output devices not shown here. This type of firmware may be known as a basic/input output system (BIOS). The memory may also comprise random access memory (RAM) 20. The operating system and application programs (e.g., graphical user interfaces) may be loaded into the RAM 20 for execution.

The IHS 5 may be implemented with a network port 45 to permit communication over a network 70 such as a local area network (LAN) or a wide area network (WAN), such as the Internet. As understood by those skilled in the art, IHS 5 implementations may also include an assortment of ports and interfaces for different peripherals and components, such as video display adapters 35, disk drives port 50, and input/output interfaces 40 (e.g., keyboard 60, mouse 65).

Figure 2A:
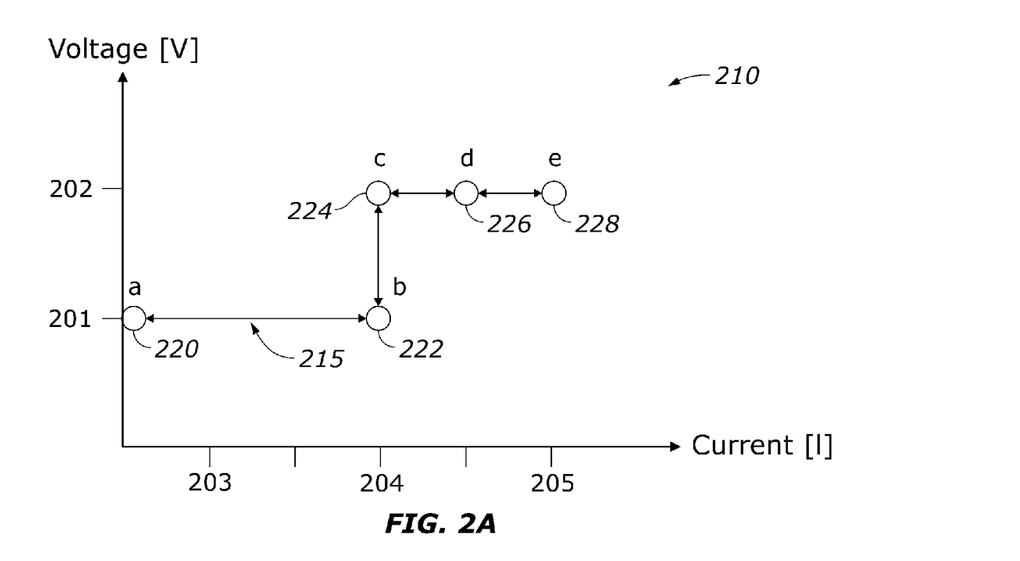
FIG. 2A provides a diagram illustrating output current-voltage characteristics of a conventional power supply system.

Turning to FIG. 2A, a diagram is shown illustrating output current-voltage characteristics of a conventional power system, i.e., of a power supply system as currently used in the art. In particular, the current-voltage diagram 210 depicts a first current-voltage curve 215 at points a-e, 220, 222, 224, 226, 228 and reference voltage magnitudes that are implemented to offer both over voltage protection and over current protection. In one possible implementation, points a-e, 220, 222, 224, 226, 228 may have the following wattages: a 220=0 W; 222=60 W; c 224=84 W; d 226=90 W; while OC protection is offered at e 228.

Still referring to FIG. 2A, point a 220 represents a minimal operational voltage value corresponding to a first voltage magnitude 201 of a power supply system as currently used in the art. According to an implementation, the first voltage magnitude 201 may be 14 V, for example. When the output voltage of the power supply system drops below the first voltage magnitude 201, the power supply system may need to be removed from service in order to protect its associated loads and/or equipment. Typically, such protection may be given by means of an undervoltage relay. The power supply system, as described above, may further be associated with an upper threshold operational voltage value, which may be represented by a second voltage magnitude 202, such as 19.5 V, for example. When the output voltage ramps to and/or above the second voltage magnitude 202, as indicated by points c-e 224, 226, 228 of the first current-voltage curve 210, the power supply system may be required to shut down to protect its associated loads and/or equipment. Further, a first current magnitude 203 may represent a high current magnitude as known to those skilled in the art. Typically, the high current magnitude 203 may be approximately 80% to 90% of the peak operational current magnitude of a power supply system. Further still, a second current magnitude 204 may represent a specific threshold operational current value of the power supply system. When the output current ramps above the second current magnitude 204, as shown by points b-e 222, 224, 226, 228 of the first current-voltage curve 210, the power supply system may be mandated to be turned off to protect its associated loads and/or equipment.

Figure 2B:
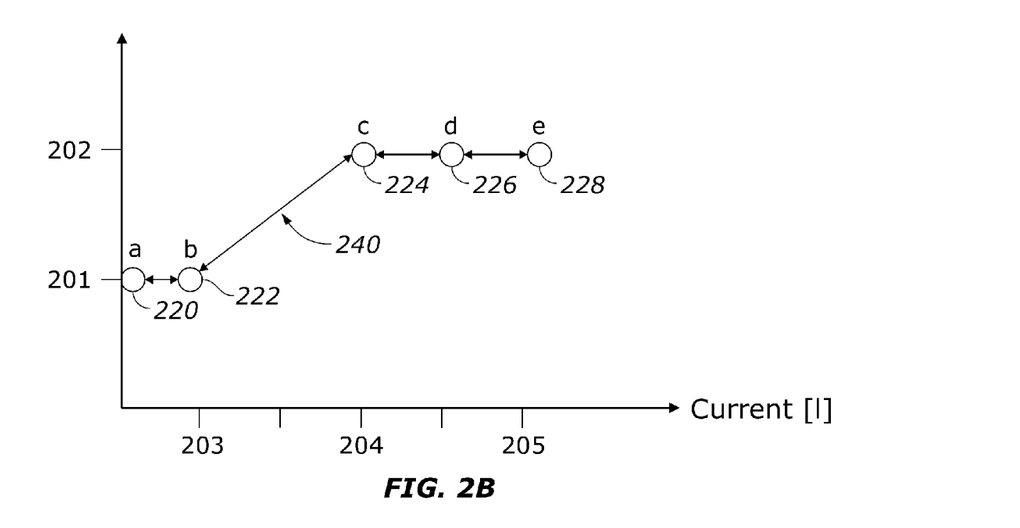
FIG. 2B provides a diagram illustrating output current-voltage characteristics of an improved power supply system, in accordance with one aspect of the present disclosure.

Turning to FIG. 2B, a second current-voltage curve 240 is provided corresponding to an improved power supply system as disclosed herein. As indicated by points a-b 220, 222 of the second current-voltage curve 240, the power supply system may be associated with a minimal operational voltage at 0 W and 30 W, respectively. When the systems power is lower than 30 W, the output voltage is maintained at 14 V to increase power efficiency. The corresponding output voltage may undergo fluctuations from its minimal operational voltage value (i.e., the first voltage magnitude 201) to its upper threshold operational voltage value (i.e., the second voltage magnitude 202) when an output current of the power supply system exceeds the high current magnitude (i.e., the first current magnitude 303), as indicated by points c-e 224, 226, 228 of the second current-voltage curve 240. In one possible implementation, points c-e, 224, 226, 228 may have the following wattages: c 224=84 W; d 226=90 W; while OC protection is offered at e 228. The output voltage may be shifted from 14 V to 19.5 V when the system power is higher than 30 W and lower than 84 W. When the system power is higher than 84 W, the output voltage may be maintained at 19.5 V, comparable to that of a conventional power supply system. As seen in experimental data, the improved power supply system, as discussed herein, may achieve a savings of approximately 8.2% of system loading while a system is in idle mode.

Significant fluctuations in the output voltage of the power supply system at the first current magnitude 203 may be a contributing factor of undesired signals and may also prevent the power supply system from operating at maximum efficiency. Such fluctuations in output voltage may be exhibited by the transient waveform diagram of the output voltage of the power supply system during its operational stage, indicated by FIGS. 3A-3B.

Referring back to FIG. 2B, a schematic is provided of current voltage characteristics associated with an improved power supply system employing an output voltage regulation method, in accordance with aspects of the present disclosure. A third current magnitude 205 may represent a first predetermined threshold current value of the improved power supply system. As shown, a positive linear correlation may be exhibited between the output voltage value and its corresponding output current value when the output current value is greater than the first current magnitude 203 and less than a second current magnitude 204, between points b 222 and c 224. Therefore, when the improved power supply system operates within the abovementioned specific operational stage, the output voltage of the improved power supply system may change in a much more linear fashion than at certain current levels shown. Also as shown in FIG. 2B, the output current value may stay relatively constant at its minimal operational voltage level or the maximal operational voltage level during other operational stages of the improved power supply system.

Since the undesired output voltage rampage may be significantly reduced or even eliminated, the improved power supply system of the present disclosure may supply an improved energy efficiency as compared to power supply systems currently used.

Figure 3A:
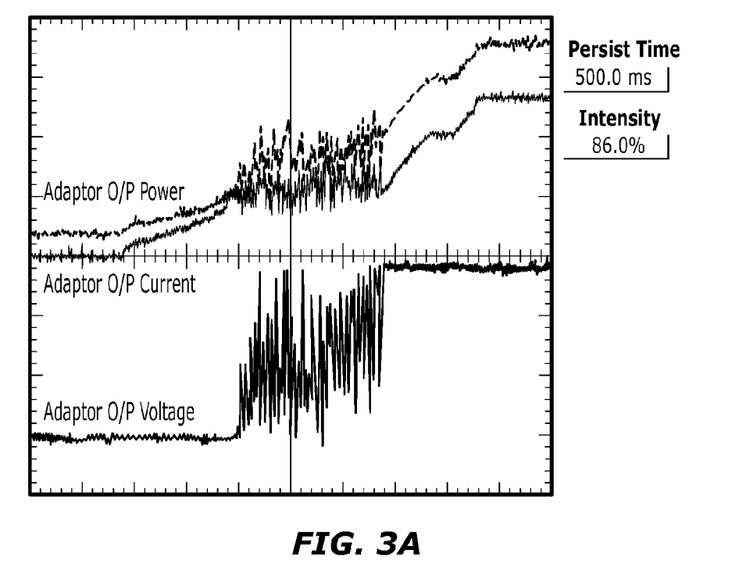
FIG. 3A provides a transient waveform diagram exhibiting output voltage fluctuations during the operational stage of a conventional power supply system.
Figure 3B:
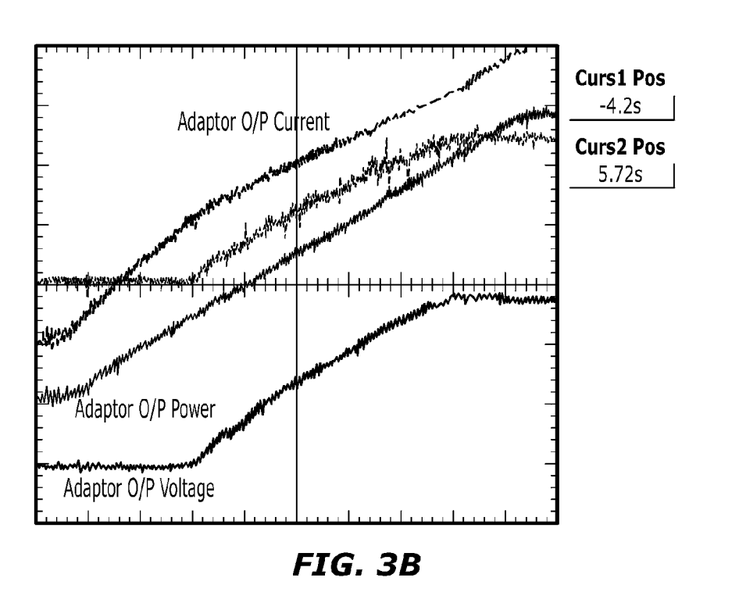
FIG. 3B provides a transient waveform diagram exhibiting output voltage fluctuations during the operational stage of an improved power supply system, in accordance with one aspect of the present disclosure.

FIGS. 3A and 3B exhibit transient waveforms of the output voltage of a conventional power supply system and an improved power supply system during their operational stages, respectively.

Figure 4:
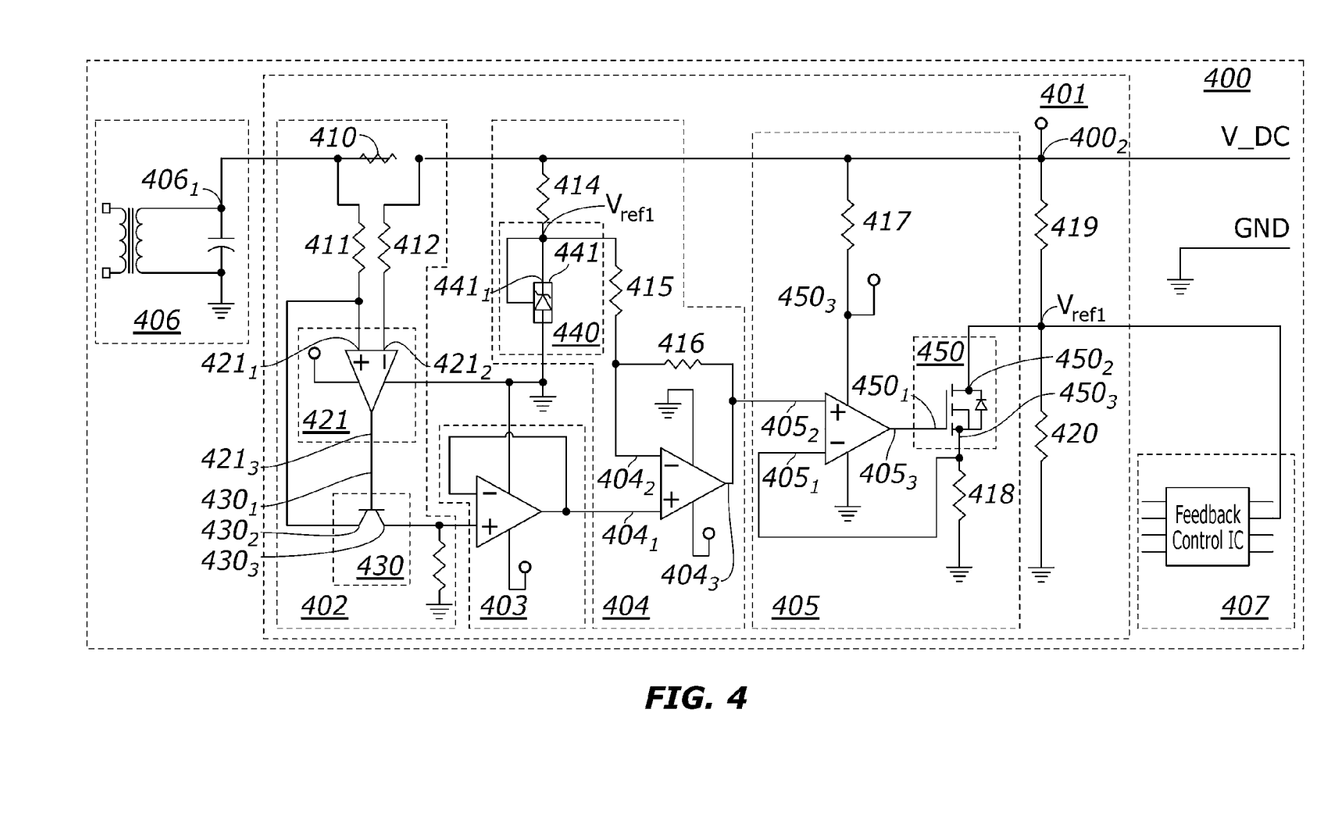
FIG. 4 represents a circuit diagram of an improved power supply system, in accordance with one aspect of the present disclosure.

FIG. 4 illustrates an exemplary implementation for an improved power supply system, indicated generally at 400. The improved power supply system 400 may receive energy from an energy source 406 such as a conventional alternating current (AC) or direct current (DC) source, for example, and may provide a DC output voltage (Vout) to a load at its output terminal $400_2$. If the energy source 406 is a conventional AC outlet, the improved power supply system 400 may comprise a DC current supply section for converting the AC source into a DC source. The DC current supply section may be in the form of any suitable energy source device 406 including, but not limited to, a conventional rectification circuit.

The improved power supply system 400 may further comprise a feedback control integrated circuit (IC) 407 for providing a predetermined voltage magnitude (Vref) as a specific reference voltage value to the power supply system 400. The IC 407 may be coupled to the output terminal $400_2$ of the power supply system 400 through a voltage dividing resistor (Rvd) 419. The Vout in combination with the Vref may generate a current flowing though the Rvd 419 and a voltage across the Rvd 419 (VRvd). In accordance with the Superposition Principle, the Vref, which may be relatively constant, may equal the Vout minus the VRvd. The Vout of the power supply system 400 may be indicated by the formula: Vout=Vref+VRvd. The Vref may be kept relatively constant despite variations in the loads presented to the power supply system's output terminal $400_2$ or any reasonable voltage variation at the power supply system's input terminal.

The improved power supply system 400 may further comprise a control circuit 401 interposed between the energy source 406 and the IC 407. The control circuit 401 may regulate the Vout and/or the output current (Iout) of the improved power supply system 400.

Continuing with FIG. 4, the control circuit 401 may comprise a first circuit, such as a current sense circuitry 402. The current sense circuit 402, also known as a current-sense amplifier, may detect a first current (Iesdout) outputted by the energy source 406 flowing through the current sense circuit 402, wherein Iesdout may be approximately equal to the Iout. The Iesdout may further be converted into a first voltage signal (Vcsc) at an output terminal $400_2$ of the current sense circuit 402. The output current may then be amplified 50-100 times that of the sensing voltage.

The current sense circuit 402 may comprise a current sensing resistor (Rs) 410. The Rs may detect a current signal flowing through the current sense circuit 402. Particularly in the present disclosure, the Iesdout may be sensed by the Rs when Iesdout flows through the current sense circuit 402. Iesdout may then generate a voltage signal (Vsense) across the Rs. In accordance with Ohm's Law, Vsense may be indicated by the formula: Vsense=Iesdout*Rs.

The current sense circuitry 402 may further comprise two current limiting resistors (e.g., RI411) 411, (e.g., RI412) 412 and a current sense amplifier 421. As depicted, an output terminal $406_1$ of the energy source device 406 may be coupled to a positive input terminal $421_1$ of the current sense amplifier 421 through a current limiting resistor, such as RI 411. The Rs may be interposed between RI 411 and RI 412, wherein RI 412 may be coupled to a negative input terminal $421_2$ of the current sense circuit amplifier 421. The input terminals of amplifiers, as known to those skilled in the art, may be manufactured to have relatively high impedance. Therefore, the negative input terminal $421_2$ of the current sense amplifier 421 may have high a relatively high impedance. In accordance with the Superposition Principle, a voltage value (Vcsain−) at the negative input terminal $421_2$ of the current sense amplifier 421 may be equal to an output voltage (Vesdout) of the energy source device 406 minus the Vsense across the Rs 410.

Typically, amplifiers are manufactured as such that the impedance between a positive terminal of an amplifier and a negative terminal of an amplifier are relatively high, as known to those skilled in the art. Therefore, no current may flow through the negative input terminal $421_2$ of the current sense amplifier 421 to the positive input terminal $421_1$ of the current sense amplifier 421. Further, the voltage value of the Vcsain− may be equal to the voltage value (Vcsain+) of the positive input terminal $421_1$ of the current sense amplifier 421. As such, the current sense amplifier 421 may force the voltage value of Vcsain+ to match that of the Vcsain−.

Thus, in accordance with the Superposition Principle, a voltage of V(RI411) across RI 411 may be indicated by the formula indicated as below:

$$V(RI411)=Vesdout-Vcsain+=Vesdout-Vcsain-=Vesdout-(Vesdout-Vsense)=Vsense.$$

In accordance with Ohm's Law, the V(RI411) may then create a second current (I(RI 411)) to flow through RI 411 that may be equal to Vsense/RI 411.

The current sense circuitry 402 may further comprise a bipolar transistor 430 and a ground resistor 418. A base input terminal $430_1$ of the bipolar transistor 430 may be coupled to the output terminal $421_3$ of the current sense amplifier 421 to detect a third current signal (Icscout) outputted by the current sense amplifier 421. A collector terminal $430_2$ of the bipolar transistor 430 may be coupled to the positive input terminal $421_1$ of the current sense amplifier 421 so that the I(RI 411) may flow into the collector terminal $430_2$.

When the Icscout flowing into the base input terminal $430_1$ is greater than a threshold current value (Vt) of the bipolar transistor 430, the bipolar transistor 430 may be rendered conductive and may allow current to flow from the collector terminal $430_2$ to an emitter terminal $430_3$ of the bipolar transistor 430. When the I(RI 411) flows into the collector terminal, a current (Ie) flowing out of the emitter terminal $430_3$ may be equal to the I(RI 411) multiplied by a current amplification factor β. Current amplification factor β may be determined by the characteristics of the bipolar transistor selected. When the Ie flows through the ground resistor (Rgd) 413, a voltage V(Rgd) may be generated across the Rgd, in accordance with Ohm's Law. The V(Rgd) may also be referred to as Vcsc, as mentioned above. Therefore, the Vcsc of the current circuitry 402 may be indicated by the formula below:

$$Vcsc=V(Rgd)=Rgd*Ie=Rgd*(I(RI411))*β=Rgd*(Vsense/RI411)*β.$$

The current sense circuitry 402 can be implemented, for example, using a model MAX4372f available from Maxim Direct, in accordance with one implementation.

The control circuitry 401 may further comprise an impedance conversion unit 403 coupled to the current sense circuitry 402. The Vcsc of the current sense circuitry 402 may be the same as an input voltage signal (Vicuin) of the impedance conversion unit 403.

Typically, an impedance conversion unit may be applied to alleviate a significant mismatch between the input impedance of an amplifier and a system providing the input signal. The ability of an amplifier circuit to reproduce an input signal is based on various factors, including the bandwidth of the amplifier, the frequency and/or the amplitude of the input signal, the impedance of the input system, or an associated sensor, transmission line impedance that provides the input signal, and the input impedance of the amplifier. In order to obtain a relatively constant gain over an amplifier, it is desirable to match the input impedance of the amplifier and the impedance of the input system with the transmission line impedance that provides the input signal to the amplifier. The impedance conversion unit 403, in particular, may be designed to transfer the Vcsc from the current sense circuitry 402, having a high output impedance level, to an adjacent circuit with a low input impedance level. The interposed impedance conversion unit 403 may prevent the adjacent circuitry from improperly loading the current sense circuitry 402 that may be interfering with its desired operation. Particularly in the present disclosure, the output voltage Vcsc of the current sense circuitry 402 may be unchanged when transferred to the adjacent circuit when such impedance conversion unit 403 may be implemented by a voltage follower. Therefore, an output voltage of the impedance conversion unit 403 (Vicuout) may be indicated by the formula: Vicuout=Vcsc=Rgd*(Vsense/RI 411)*β.

Moreover, the control circuitry 401 may comprise an amplification circuit 404 coupled to the impedance conversion unit 403. An input voltage (Vacin+) on a positive terminal 4041 of the amplification circuit 404 may be the same as the Vicuout of the impedance conversion unit 403.

The amplification circuit 404 may comprise a shunt voltage regulator 440 coupled to the negative input terminal $404_2$ of the amplification circuit 404 through a voltage dividing resistor Rvd 415. The voltage dividing resistor Rvd 415 may provide a specific reference voltage (Vref1) to compare with the Vacin+ of the amplification circuit 404. A shunt, as used herein, may refer to a connection in parallel. The voltage regulator may be any suitable circuitry capable of producing a stable voltage across any load. As depicted in FIG. 4, for operating purposes, the shunt voltage regulator 440 may be interposed between ground and the output terminal $400_2$ of the power supply system 400 through a current limiting resistor RI 414.

The shunt voltage regulator 440 may comprise a zener diode 441. As know to those skilled in the art, zener diodes may be widely used as voltage reference providers and as shunt regulators to regulate the voltage across small circuits. When coupled in parallel with a variable voltage source so that it may be reverse biased, a zener diode may conduct when a voltage (Vzd) across the diode reaches a diode's reverse breakdown voltage (Vbd). The Vbd may be generally determined by the characteristics of the zener diode selected. From that point on, the relatively low impedance of the diode may keep the voltage across the zener diode at a relatively constant value.

Particularly in the present disclosure, the zener diode 441 may be coupled in parallel with the power supply system 400 so that it may be reverse biased. The Vzd of the zener diode 441 may always satisfy the condition of reaching the Vbd of the zener diode 441 when selecting an appropriate zener diode for that purpose. The zener diode 441 may provide a relatively constant voltage value (Vsvr) when the above mentioned conditions have been satisfied. Such Vsvr may also be referred to as the earlier mentioned Vref1. Thus, the shunt voltage regulator 440 may always provide a relatively constant reference voltage of Vref1 despite variations in the load presented to the power supply system's output, or any reasonable voltage variation at the power supply system's input.

The shunt voltage regulator 440 may comprise a current limiting resistor (RI414) 414 interposed between an input terminal 441$_1$ of the zener diode 441 and the output terminal 400$_2$ of the power supply system 400. In selecting a suitable current limiting resistor coupled to the zener diode 441, the RI 414 may satisfy various conditions to render the zener diode 441 functional. As one possible condition, the resistance of the RI 414 may be small enough that the current flowing through the zener diode 441 may keep the zener diode 411 in reverse breakdown. As another possible condition, the resistance of the RI 414 must be large enough that the current through the zener diode 441 may not cause damage to the device.

The shunt voltage regulator 440 may be implemented, for example, using a model TL 431 available from Fairchild Semiconductor Corporation, in accordance with one implementation.

The amplification circuitry 404 may further comprise a voltage dividing resistor (Rvd 416) 416 interposed between the negative input terminal 404$_2$ and an output terminal 404$_3$ of the amplification circuitry 404.

The Vref1 provided by the shunt voltage regulator 440 may generate a current flowing through the Rvd 415 and the Rvd 416 and may create two voltages V415 and V416 separately across the Rvd 415 and the Rvd 416, in accordance with Ohm's Law. Further, in accordance with the Superposition Principle, the output voltage (Vacout) of the amplification circuitry 404 may be equal to the Vref1 minus both the V415 and the V416. As elaborated earlier, since a negative input terminal 404$_2$ of the amplification circuitry 404 may have high (ideally infinite) impedance, the amplification circuitry 404 may force a voltage (Vacin+) on the positive input terminal 404$_1$ to match with a voltage (Vacin−) on the negative input terminal 404$_2$. Further, in accordance with the Superposition Principle, the Vacin− may also be equal to the Vref1 minus the V415. Therefore, the Vacin+ may be equal to the Vref1 minus the V415. Thus, the relationship between Vacin+ and Vacout may be indicated by the following formula: Vacout=Vref1−V415−V416=(Vacin+)−V416.

In one implementation of the present disclosure, Rvd 415 and Rvd 416 may have the same resistance. Vacout may be defined by the following formulas:

$$Vacout=2*(Vacin+)-Vref1$$

$$Vacout=2*(Rgd*(Vsense/RI411)*\beta)-Vref1$$

As illustrated above, the amplification circuitry 404 may have zero output signal when the Vacin+ of the amplification circuit 404 is less than one half of the Vref1. That is, the amplification circuitry 404 may only have an output signal Vacout when the Vacin+ is greater than one half of the Vref1.

Further still, the control circuitry 401 may comprise voltage current conversion circuitry 405 coupled to the amplification circuitry 404 for converting the output voltage signals (Vacout) received from the amplification circuitry 404 into a current signal (Ivcc). As shown in FIG. 4, an input voltage (Vvccin+) on a positive terminal 405$_2$ of the voltage current conversion circuitry 405 may be the same as the Vacout of the amplification circuitry 404.

The voltage current conversion circuitry 405 may comprise a ground resistor (Rgd418) 418 interposed between ground and a negative input terminal 405$_1$ of the voltage current conversion circuitry 405. A voltage (Vvccin−) on the negative input terminal 405$_1$ of the voltage current conversion circuitry 405 may generate a current (Irgd418) flowing through the Rgd 418 and therefore create a voltage (Vgd418) across the Rgd418, in accordance with Ohm's Law. In one implementation, Vgd418 may be equal to Vvccin−. As mentioned earlier, since the negative input terminal 405$_1$ of the voltage current conversion circuitry 405 may have a relatively high impedance, the voltage current conversion circuitry 405 may force the Vvccin+ on the positive input terminal 405$_2$ to match the Vvccin− on the negative input terminal 405$_1$. Therefore, Vvccin+ may be equal to Vrgd418.

The current Irgd418 may be indicated by the formulas below:

$$Irgd418=Vrgd418/Rgd418=(Vvccin+)/Rgd418$$

$$Irgd418=(2*(Rgd*(Vsense/RI411)*\beta)-Vref1)/Rgd418$$

The control circuitry 401 may further comprise a metal-oxide-semiconductor field-effect transistor (MOSFET) switch 450 comprising a gate terminal 450$_1$ coupled to an output terminal 405$_3$ of the voltage current conversion circuitry 405. A drain terminal 450$_2$ of the MOSFET switch 450 may be coupled to the IC 407 for detecting the reference voltage value Vref. As shown in FIG. 4, an input voltage (Vg) on the gate terminal 450$_1$ of the MOSFET switch 450 may be the same as the Vvccout of the voltage current conversion circuitry 405.

As known to those skilled in the art, the operation of a MOSFET switch may be separated into three different modes, depending on the voltages at various terminals of the voltage current conversion circuitry 405. For example, an N-channel MOSFET (N-MOSFET) may comprise operational modes including, but not limited to, a cutoff mode, a triode mode and a saturation mode.

The N-MOSFET switch may comprise a threshold voltage (Vth). When a voltage (Vgs) across a gate terminal and a source terminal of the N-MOSFET switch is less than the Vth of the N-MOSFET switch, it may be rendered non-conductive. As such, currents between the drain terminal 450$_2$ and the source terminal 450$_3$ of the MOSFET switch 450 may ideally be zero. Particularly in the present disclosure, the current Irgd418 may not flow from the drain terminal 450$_2$ to the source terminal 450$_3$ of the MOSFET switch 450.

When the Vgs across the gate terminal and the source terminal of the N-MOSFET switch are greater than the Vth of the N-MOSFET switch, and a voltage (Vds) across a drain terminal and the source terminal of the N-MOSFET switch are greater than Vgs less the Vth of the N-MOSFET switch, the N-MOSFET switch may be rendered conductive and allow currents to flow between the drain terminal and the source terminal. Such a mode may also be known as a saturation mode. In this mode, the N-MOSFET switch may have relatively low impedance. In one implementation, the N-MOSFET switch may have an impedance of zero. A current flowing through the drain terminal (Id) may be approximately equal to a current flowing through the source terminal (Is) of the N-MOSFET switch. Particularly in the present disclosure, the Irgd418 may be equal to a current (I450$d$) flowing through the drain terminal 450$_2$ of the MOSFET switch 450.

The triode mode, known as a linear region or an ohmic mode, may also render an N-MOSFET switch conductive. However, other than having relatively low impedance, the N-MOSFET switch may work as a resistor controlled by the gate terminal voltage relative to both the source terminal and the drain terminal voltages. Therefore, in particular, the Irgd418 in triode mode may be less than the I450$_d$ of the MOSFET switch 450 during a saturation mode The control circuitry 401 may further comprise a voltage dividing resistor Rvd 420. As depicted by FIG. 4, the Rvd420 may be interposed between ground and the drain terminal 450$_2$ of the MOSFET switch 450. The earlier mentioned Rvd419 may be interposed between the output terminal 400$_2$ of the power supply system 400 and the drain terminal 450$_2$ of the MOSFET switch 450.

Further, as depicted in FIG.4, the IC 407 may be coupled to the Rvd420 via the drain terminal 450$_2$ of the MOSFET switch 450. The Vref' provided by the IC 407 may generate a fourth current (I420) flowing through the Rvd420. The Vref' may also generate a fifth current (I404) when the MOSFET switch 450 is rendered conductive.

As discussed earlier, the amplification circuitry 404 may only have output signals Vacout when the Vacin+ is greater than one half of the Vref1. In the event that Vacout is zero, the MOSFET may be shut down due to the input voltage Vvccin+ of the voltage current conversion circuitry 405 being zero. In the meantime, as disclosed earlier, the voltage current conversion circuitry 405 may force the Vvcc– to match the Vvcc+, resulting in no current flow through the ground resistor 418. As a consequence, the Vout of the power supply system 400 in the above situation may be calculated by the formula below:

$$Vout=(Vref'/Rvd420)*(Rvd419+Rvd420)$$

wherein the Vout may be referred to as the minimal operational voltage value represented by the first voltage magnitude 201 of the previously mentioned current-voltage diagram 210. A current magnitude of the Iout corresponding to the Vout may be referred to as the third current magnitude 203 of the previously mentioned current-voltage diagram 210.

In the event that the Vacout is above zero, the Vvccin+ may generate Irgd418 flowing through Rgd418. The Irgd418 may only contribute to regulate the Vout of the power supply system 400 when the MOSFET switch 450 is rendered conductive. The MOSFET switch 450 may be controlled by the voltages of the three terminals 450$_1$, 450$_2$ and 450$_3$, as elaborated earlier.

Taking the saturation mode of the MOSFET switch 450 as an example, the Irgd418 may be approximately equal to the I404 since the MOSFET switch 450 may have relatively low impedance. In accordance with the Superposition Principle, the Vout of the power supply system 400 may be equal to the Vref' adding a voltage (V(Rvd419)) across the Rvd419. Further, in accordance with Ohm's law, V(Rvd419) may be indicated by the following formula:

$$V(Rvd419)=(I420+Irgd418)*Rvd419.$$

Therefore, when the MOSFET switch 450 is rendered conductive, the Vout of the power supply system 400 may be indicated by the following formula:

$$Vout=Vref'+(I420+Irgd418)*Rvd419.$$

The Vout of the power supply system may be referred to as the upper threshold operational voltage value represented by the second voltage magnitude 302. A current magnitude of the Iout corresponding to the Vout may be referred to as the first current magnitude 304.

As demonstrated by the formulas above, a correlation may exist between the Vout and the Iout of the power supply system 400. Vout and Iout may exhibit a positive linear correlation when the following are determined: two ground resistors, Rgd and Rgd418; amplification factor β; two predetermined reference voltage magnitudes, Vref' and Vref1; and the two impedance resistors, Rvd 419 and Rvd 420. In such a situation, the Vout may change in a linear fashion, rather than fluctuating in a non-linear fashion, when the power supply system 400 operates within the specific operational stage defined by the first current magnitude 203 and the third current magnitude 205 of the previously mentioned current-voltage diagram 210. As a consequence, the improved power supply system disclosed herein may decrease the undesired output voltage fluctuations and may supply better energy efficiency and/or workability than current power supply systems.

Figure 5:
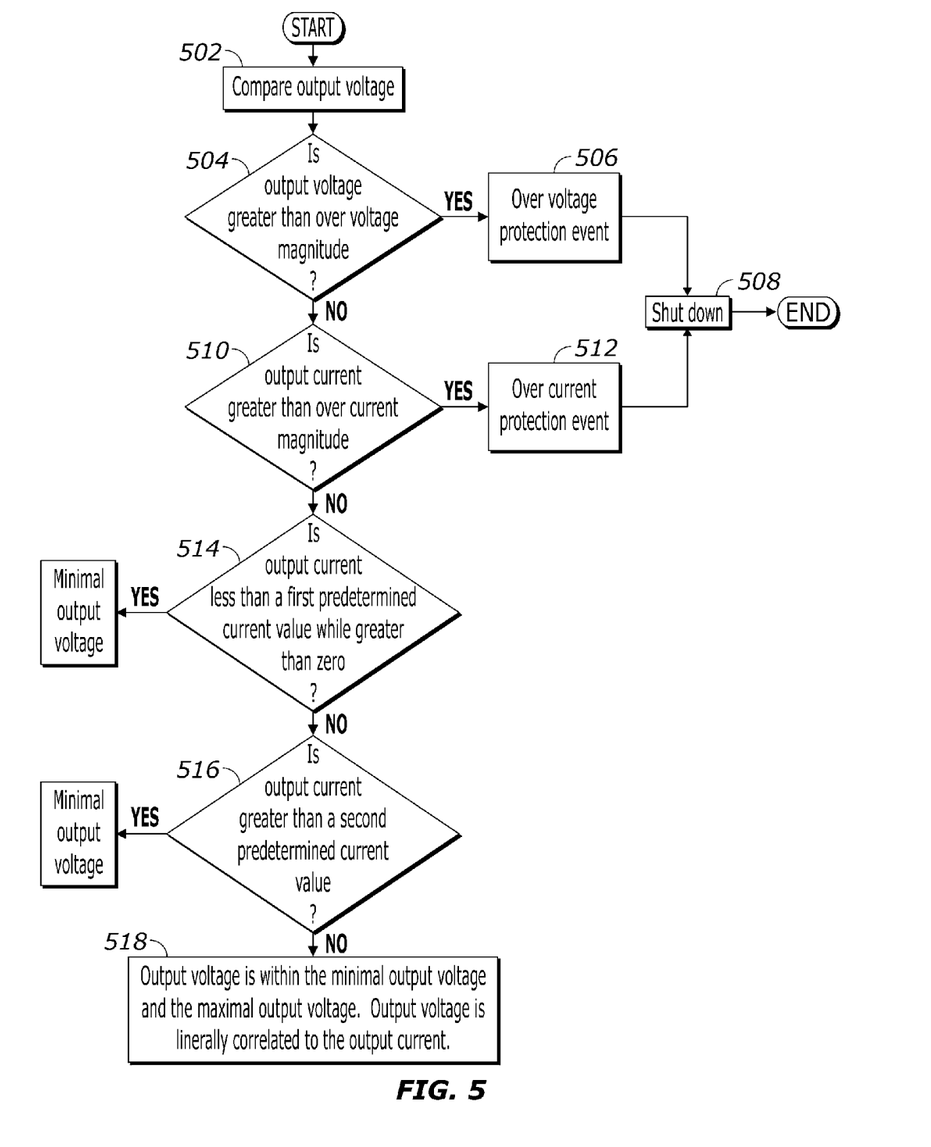
FIG. 5 provides a flow diagram illustrating a method for regulating output voltage of an improved power supply system in accordance with one aspect of the present disclosure.

FIG. 5 provides a flowchart of a method for regulating the output voltages of an improved power supply system in accordance with one aspect of the present disclosure.

Before an improved power supply system can provide energy to its associated loads, and/or equipment, the system may initially compare its output voltage to a predetermined overvoltage magnitude. In step 504, it is determined whether the output voltage of the improved power supply system is greater than the predetermined overvoltage magnitude. If the output voltage is greater than the predetermined overvoltage magnitude, the improved power supply system may initiate an overvoltage protection event in step 506. The entire power supply system may then shut down in step 508.

In the event the output voltage is less than the overvoltage magnitude in step 504, the improved power supply system may then compare its output current to a predetermined overcurrent magnitude. In step 510, it is determined whether the output current(s) of the improved power supply system is/are greater than the predetermined overcurrent magnitude. If the output currents are greater than the predetermined overcurrent magnitude, the improved power supply system may initiate an overcurrent protection event in step 512. The entire power supply system may then shut down in step 508.

In the event the output voltages are less than the overcurrent magnitude in step 510, the improved power supply system may then compare its output current to a first predetermined current magnitude. In step 514, it is determined whether the output currents of the improved power supply system are greater than zero volts while less than a first predetermined current magnitude.

In the event the output voltages are greater than the overcurrent magnitude in step 514, the improved power supply system may then compare its output currents to a second predetermined current magnitude. In step 516, it is determined whether the output currents of the improved power supply system are greater than a second predetermined current magnitude.

In the event the output current is less than the second predetermined current value in step 516, the output voltages may reach a voltage value between the minimal voltage value and the maximal voltage value in step 518. In addition, a linear correlation may be established between the output voltage and the output current of the improved power supply system.

Systems and methods proposed herein may provide a means to provide stable output voltage and current for power supply systems. Such self-controlled power supply system may function as a world-wide adaptor, not requiring an external pin such as a control pin or PSID. Further, such systems may support maximum power at a particular current, not requiring extra components such as an additional/larger connector or thicker cabling.

Furthermore, methods of the present disclosure, detailed description and claims may be presented in terms of logic, software or software implemented aspects typically encoded on a variety of storage media or storage medium including, but not limited to, computer-readable storage medium/media, machine-readable storage medium/media, program storage medium/media or computer program product. Such storage media, having computer-executable instructions, may be handled, read, sensed and/or interpreted by an information handling system (IHS), such as a computer. Generally, computer-executable instructions, such as program modules, may include routines, programs, objects, components, data structures, and the like, which perform particular tasks, carry out particular methods or implement particular abstract data types. Those skilled in the art will appreciate that such storage media, including non-transitory signals, may take various forms such as cards, tapes, magnetic disks (e.g., floppy disk or hard drive) and optical disks (e.g., compact disk read only memory ("CD-ROM") or digital versatile disc ("DVD")). It should be understood that the given implementations are illustrative only and shall not limit the present disclosure.

Although the present disclosure has been described with reference to particular examples, embodiments and/or implementations, those skilled in the art will recognize that modifications and variations may be made without departing from the spirit and scope of the claimed subject matter. Such changes in form and detail, including use of equivalent functional and/or structural substitutes for elements described herein, fall within the scope of the appended claims and are intended to be covered by this disclosure.

What is claimed is:

1. A power supply system comprising:
    a first circuit for detecting a magnitude of a current drawn from an energy source by the power supply system and providing an output related thereto;
    a second circuit for adjusting an output voltage supplied to a connector based on an output of the first circuit, wherein:
        the output voltage supplied to the connector is at a first value when the output of the first circuit is below a given first threshold;
        the output voltage supplied to the connector is at a second value, greater than said first value, when the output of the first circuit is above a given second threshold; and
        the output voltage supplied to the connector is at a third value, between said first and second values, when the output of the first circuit is between the first and second given thresholds.

2. The system of claim 1, wherein the output voltage supplied to the second connector at the third value correlates with the magnitude of the output of the first circuit, when the output of the first circuit is between the first and second given thresholds.

3. The system of claim 1, wherein the first circuit comprises a current sense unit.

4. The system of claim 1, wherein the second circuit further comprises a feedback control unit for stabilizing the output voltage supplied to the connector.

5. The system of claim 4, wherein the feedback control unit comprises a negative feedback amplification circuit.

6. The system of claim 1, wherein the first circuit further comprises a voltage current converter.

7. A method to enhance the efficiency of a power supply system, the method comprising:
    detecting, through a first circuit, the magnitude of the current drawn from an energy source by a power supply system and providing an output related thereto;
    adjusting, through a second circuit, the output voltage supplied to a connector based on the output of the first circuit; whereby:
        the output voltage supplied to the connector is at a first value when the output of the first circuit is below a given first threshold;
        the output voltage supplied to the connector is at a second value, greater than said first value, when the output of the first circuit is above a given second threshold; and
        the output voltage supplied to the connector is at a third value, between said first and second values, when the output of the first circuit is between the first and second given thresholds.

8. The method of claim 7, wherein the output voltage supplied to the connector at the third value correlates with the magnitude of the output of the first circuit, when the output of the first circuit is between the first and second given thresholds.

9. The method of claim 7, wherein the first circuit comprises a current sense unit.

10. The method of claim 7 wherein the second circuit further comprises a feedback control unit for stabilizing the output voltage supplied to the connector.

11. The method of claim 10, wherein the feedback control unit comprises a negative feedback amplification circuit.

12. The method of claim 7, wherein the first circuit further comprises a voltage current converter.

13. A non-transitory computer-readable storage medium having encoded thereon executable instructions that, when executed by a processor, cause the processor to:
    detect, through a first circuit, the magnitude of the current drawn from an energy source by a power supply system and providing an output related thereto;
    adjust, through a second circuit, the output voltage supplied to a connector based on the output of the first circuit; wherein the second circuit further comprises a feedback control unit for stabilizing the output voltage supplied to the connector, and whereby:
        the output voltage supplied to the connector is at a first value when the output of the first circuit is below a given first threshold;
        the output voltage supplied to the connector is at a second value, greater than said first value, when the output of the first circuit is above a given second threshold; and
        the output voltage supplied to the connector is at a third value, between said first and second values, when the output of the first circuit is between the first and second given thresholds.

14. The non-transitory computer-readable storage medium of claim 13, wherein the output voltage supplied to the connector at the third value correlates with the magnitude of the output of the first circuit, when the output of the first circuit is between the first and second given thresholds.

15. The non-transitory computer-readable storage medium of claim 13, wherein the first circuit comprises a current sense unit.

16. The non-transitory computer-readable storage medium of claim 13, wherein the feedback control unit comprises a negative feedback amplification circuit.

17. The non-transitory computer-readable storage medium of claim 7, wherein the first circuit further comprises a voltage current converter.

* * * * *